SEMICONDUCTOR DEVICES COMPRISING MOUNTED WHISKERS

Filed Nov. 20, 1961 4 Sheets-Sheet 1

INVENTOR.
MOGENS W. BANG
BY John R Doherty
ATTORNEY

INVENTOR.
MOGENS W. BANG
BY
ATTORNEY

INVENTOR.
MOGENS W. BANG
BY John R Hoherty
ATTORNEY

SEMICONDUCTOR DEVICES COMPRISING MOUNTED WHISKERS

Filed Nov. 20, 1961 4 Sheets-Sheet 4

INVENTOR.
MOGENS W. BANG
BY John R. [signature]
ATTORNEY

United States Patent Office 3,302,077

Patented Jan. 31, 1967

3,302,077

SEMICONDUCTOR DEVICES COMPRISING MOUNTED WHISKERS

Mogens W. Bang, Cleveland, Ohio, assignor to Union Carbide Corporation, a corporation of New York Filed Nov. 20, 1961, Ser. No. 153,532
4 Claims. (Cl. 317—235)

This invention relates generally to electrical current modifying devices having a whisker as their operative element and to a method for fabricating such devices. In particular, the invention is principally concerned with solid states devices made from monocrystalline semiconductor whiskers.

A "whisker" as the term is used herein and in the appended claims refers particularly to needle-like materials which are produced by vapor or electrolytic deposition techniques known in the art. The technology of whiskers and methods for their production are described in detail in the literature, particular reference being made to the articles, "Metal Whiskers," by S. S. Brenner, Scientific America, volume 203, 1960, and "Growth and Perfection of Crystals," Part 2. edited by Doremus, Roberts & Turnbull, John Wiley & Sons, Inc., New York, 1958.

In the copending application of John D. Venables, Serial No. 153,530, filed concurrently herewith, now U.S. 3,201,665, there is described and claimed a number of solid state devices having a semiconductor whisker as their operative element. These devices find advantage in the relatively small size of the whisker and its superior crystal structure as compared to most semiconductor materials presently used. The relatively small size of the whisker is of particular advantage for it eliminates a great many of the difficulties encountered in the manufacture of prior art devices and greatly reduces their costs.

As an illustration, the fabrication of a field effect device is greatly simplified when a whisker is used as its operative element. In a field effect device it is required that the operative element be of an extremely small size comparable to the thickness of the barrier layer upon which this device depends. The conventional practice is to prepare the operative element from a large semiconductor boule by cutting it into wafers. Ordinarily, these wafers are relatively large as compared to the barrier layer thickness of the field effect device and in order to reduce their size, the wafers are then ground and etched. This practice obviously requires the use of intricate techniques which are costly. These prior techniques are circumvented in a field effect device made according to the Venables application, for the whisker can be produced of a relatively small size which is comparable to that of the barrier layer thickness of the field effect device.

The invention is broadly applicable to electrical current modifying devices having a whisker as their operative element such as the solid state devices described in the Venables application and including resistors and the like. The principal object of the invention is to provide electrical current modifying devices having a whisker as their operative element which are simple to fabricate and economical to manufacture. More specifically, it is another object to provide electrical current modifying devices of this character and a method for their fabrication which is particularly adapted to large scale manufacture.

In the fabrication of such solid state devices as described in the Venables application wherein a semiconductor whisker is utilized as the operative element, a particularly troublesome problem has been the attainment of proper rectifying and ohmic contacts to the whisker. The contacts mostly have been attained by such conventional techniques as bonding a metallic wire to the appropriate region of the whisker. A difficulty with such conventional techniques has been that the whisker is not easily handled with the result that these techniques have not proven to be adapted to large scale manufacture.

According to the invention, an electrical current modifying device having a whisker as its operative element is provided with a supporting structure for the whisker including at least a pair of contact elements which make electrical contact to the whisker. This supporting structure provides for rigidity in the electrical current modifying device and also makes it possible to handle the whisker with much greater ease in the fabrication of the device.

More specifically, the invention includes a method for fabricating an electrical current modifying device having a whisker as its operative element which broadly comprises the steps of initially providing a supporting structure for the whisker including at least a pair of contact elements for making electrical contact to the whisker, mounting the whisker onto the contact elements and then making electrical contact between the contact elements and the whisker.

In the instance where a solid state device is to be fabricated, rectifying and ohmic contacts to the whisker may be attained in any of several different ways. For instance, the contact elements may suitably be composed of a metal which contains an additive appropriately chosen for making the rectifying and ohmic contacts to the whisker. These contacts conveniently are then attained by thermo-compression, the contact elements and whisker being pressed together at a sufficiently high alloying temperature to achieve a thermobond between them. Another way of making the contacts is to plate or coat the contact elements with an alloying metal. This also admirably lends itself to the attainment of both rectifying and ohmic contacts by thermo-compression. A more preferred way, however, is to use metallic alloy pellets or paste positioned to the contact elements which make the contacts to the whisker. These are generally preferred be cause the contacts can be more readily attained circumferentially about the whisker. It has been found the best practice to first position the metallic alloy pellets or paste to the contact elements and then to mount the whisker to them. After the whisker has been mounted, the metallic alloy pellets or paste are then heated to an alloying temperature and cooled. In the particular instance of the metallic alloy pellets, the whisker is placed onto the pellets after which they are heated, while in the case of the metallic alloy paste, the whisker is placed into the paste which is then heated. The viscosity of the metallic alloy paste should be such that the whisker can be easily placed into it so that the paste wets the whisker about its entire circumference.

A great many materials may be used in the fabrication of an electrical current modifying device embodying the invention. In a solid state device, the whisker may be composed of a number of semiconductor materials of the desired type conductivity, for example, doped and undoped germanium, silicon and silicon carbide, and preferably is of the monocrystalline variety. In a resistor, most any electrically conductive whisker of the desired resistance may be used. A particularly attractive whisker is one composed of carbon or graphite such as disclosed in the above-referred to article "Growth and Perfection of Crystals" by Doremus et al. The contact elements should be highly electrically conductive and may be composed, for example, of copper, gold plated brass, and silver. The metallic alloy pellets or paste, when utilized, may be composed of a variety of alloying metals. A suitable metal, for example, is gold. The additive for making the rectifying contact suitably may be indium, gallium or aluminum as well as alloys thereof. Suitable additives for the ohmic contacts are tin and lead or their alloys.

The invention will be described in greater detail with particular reference to field effect devices, diodes and resistors made in accordance with the invention, although it will be understood that other electrical current modifying devices may be fabricated by utilizing the principles herein described. A field effect device having a whisker as its operative element will be hereinafter referred to as a "whistor" as in the Venables application.

Figure 5:
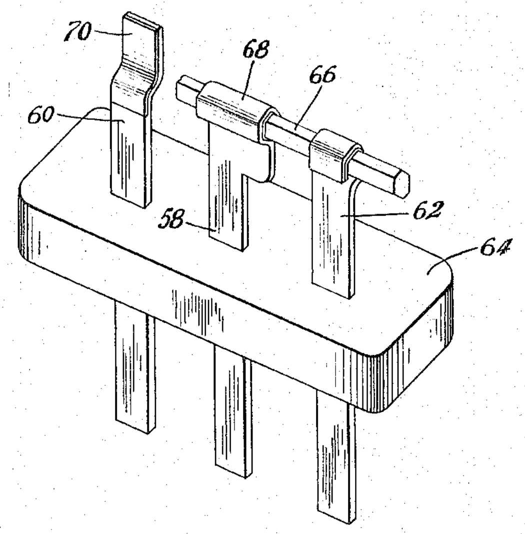
FIG. 5 is a perspective view of still another device, part being broken away to show its construction prior to fabrication.
Figure 5A:
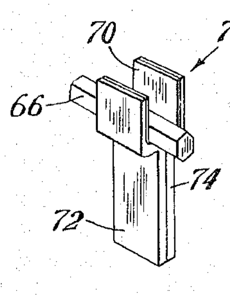
Figures 6, 7, 7A:
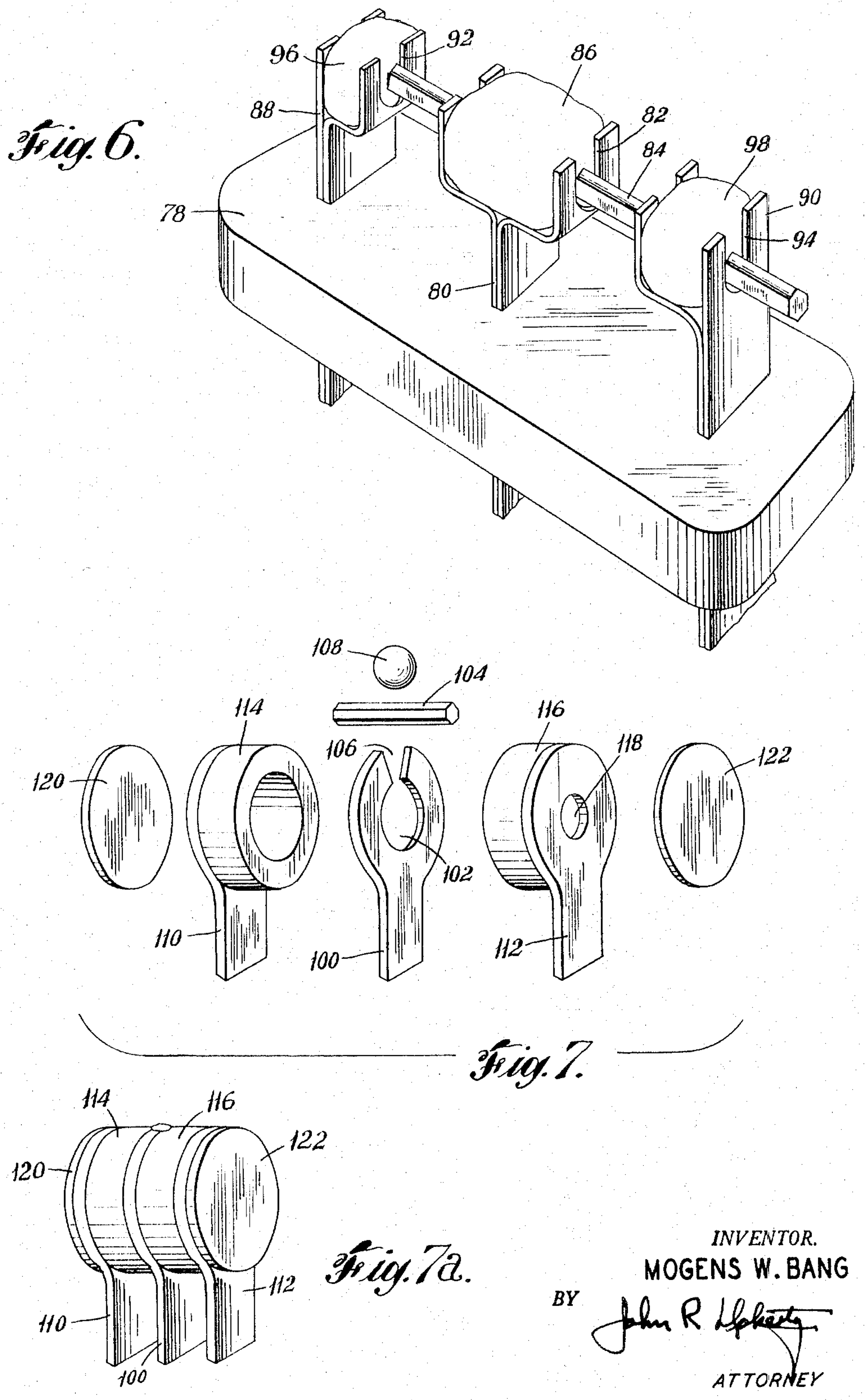
Figure 8:
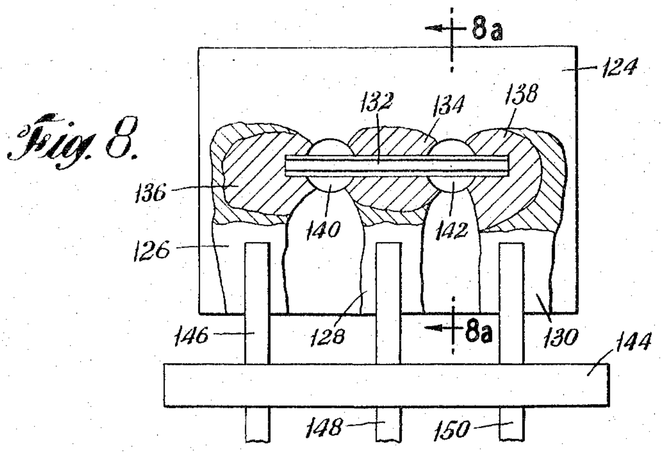
Figure 8A:
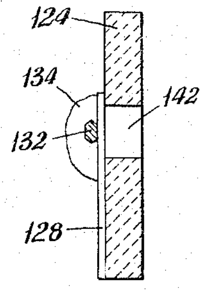
Figure 9:
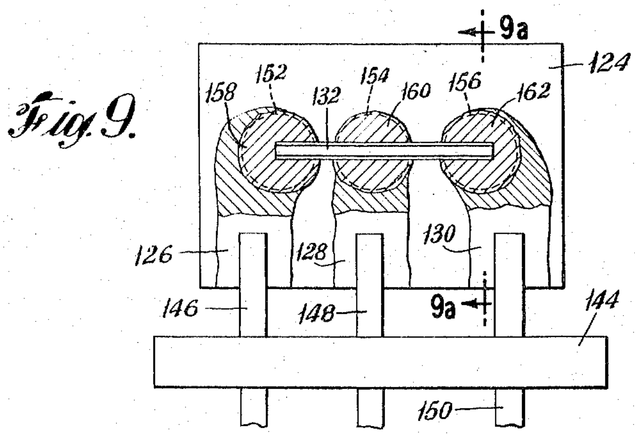
Figure 9A:
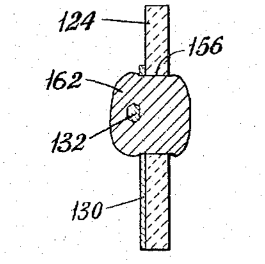
Figure 10:
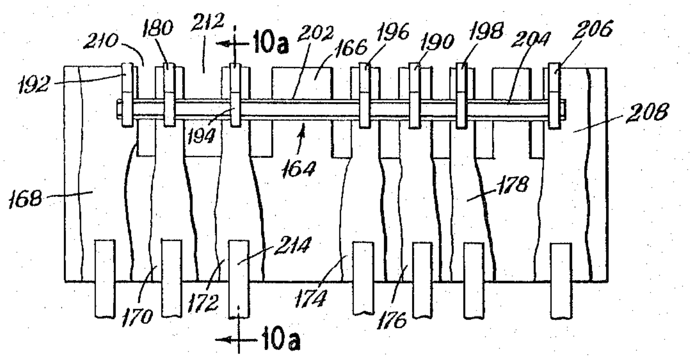

FIG. 5*a* is a similar view showing a modification of FIG. 5;

FIG. 6 is a perspective view of still another device;

FIG. 7 is an exploded view showing the fabrication of still another device;

FIG. 7*a* is a perspective view of the assembled device of FIG. 7;

FIG. 8 is a plan view of a further device, part being sectioned away to show details of its construction;

FIG. 8*a* is a side elevational view taken along the line 8*a*—8*a* in FIG. 8;

FIG. 9 is similar to FIG. 8 showing a modification;

FIG. 9*a* is a side elevational view taken along the line 9*a*—9*a* in FIG. 9;

FIG. 10 is a plan view of yet another device; and

Figure 10A:
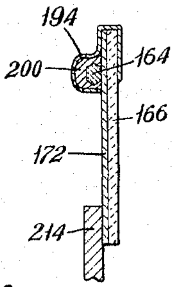

FIG. 10*a* is a side elevational view taken along the line 10*a*—10*a* in FIG. 10.

Figure 1:
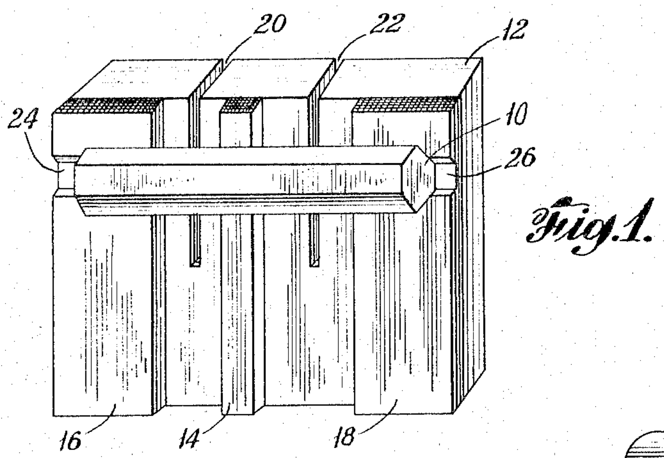
FIG. 1 is a greatly enlarged perspective view of a device embodying the invention.

Referring now to the drawing, there is shown in FIG. 1 a whistor of a printed circuit construction having as its operative element a hexagonal monocrystalline semiconductor whisker 10. As shown, the whistor comprises an insulating support plate 12 suitably of a ceramic having provided thereon a plurality of metallic printed strips 14, 16 and 18. The metallic strip 14 makes a rectifying contact and the metallic strips 16 and 18 make ohmic contacts to the whisker 10. It is an importnat feature in this construction that the metallic printed strips 14, 16 and 18 in conjunction with the insulating support plate 12 provide a supporting structure on which the whisker 10 is mounted.

In the whistor shown in FIG. 1 it will be particularly noted that the metallic strips 16 and 18 are spaced on each side of the metallic strip 14. This spacing is essential to the attainment of proper contact separation between the rectifying and ohmic contacts to the whisker 10. The contact separation is important for it determines certain of the electrical properties of the whistor, for example its resistance and gain. The width of the metallic strip 14 is also important and determines the channel length of the rectifying junction. It will also be noted in this construction that the insulating support plate 12 is preferably provided with slots 20, 22, these serving to reduce stray capacity and to relieve strain on the whisker 10.

In the fabrication of the whistor of FIG. 1 according to the method of the invention, the metallic strips 14, 16 and 18 initially are deposited or etched onto the insulating support plate 12, this being done suitably by addition or subtraction techniques conventionally employed in the fabrication of printed circuitry. The metallic strips 14, 16 and 18 are deposited or etched onto the plate 12 at spaced intervals sufficient to provide the proper contact separation desired in the whistor. The whisker 10 is then placed onto the metallic strips 14, 16 and 18 preferably in slots as at 24, 26. Both rectifying and ohmic contacts are attained suitably by heating the whisker 10 and the metallic strips 14, 16 and 18 to a sufficiently high alloying temperature and by compressing the whisker 10 into the metallic strips 14, 16 and 18 to achieve a bond. It will of course be understood that the contacts can be attained equally as well by employing metallic alloy pellets or paste positioned at the junction of the whisker 10 and the metallic strips 14, 16 and 18, the bond being attained by heat treatment as above described.

Figures 2, 3:
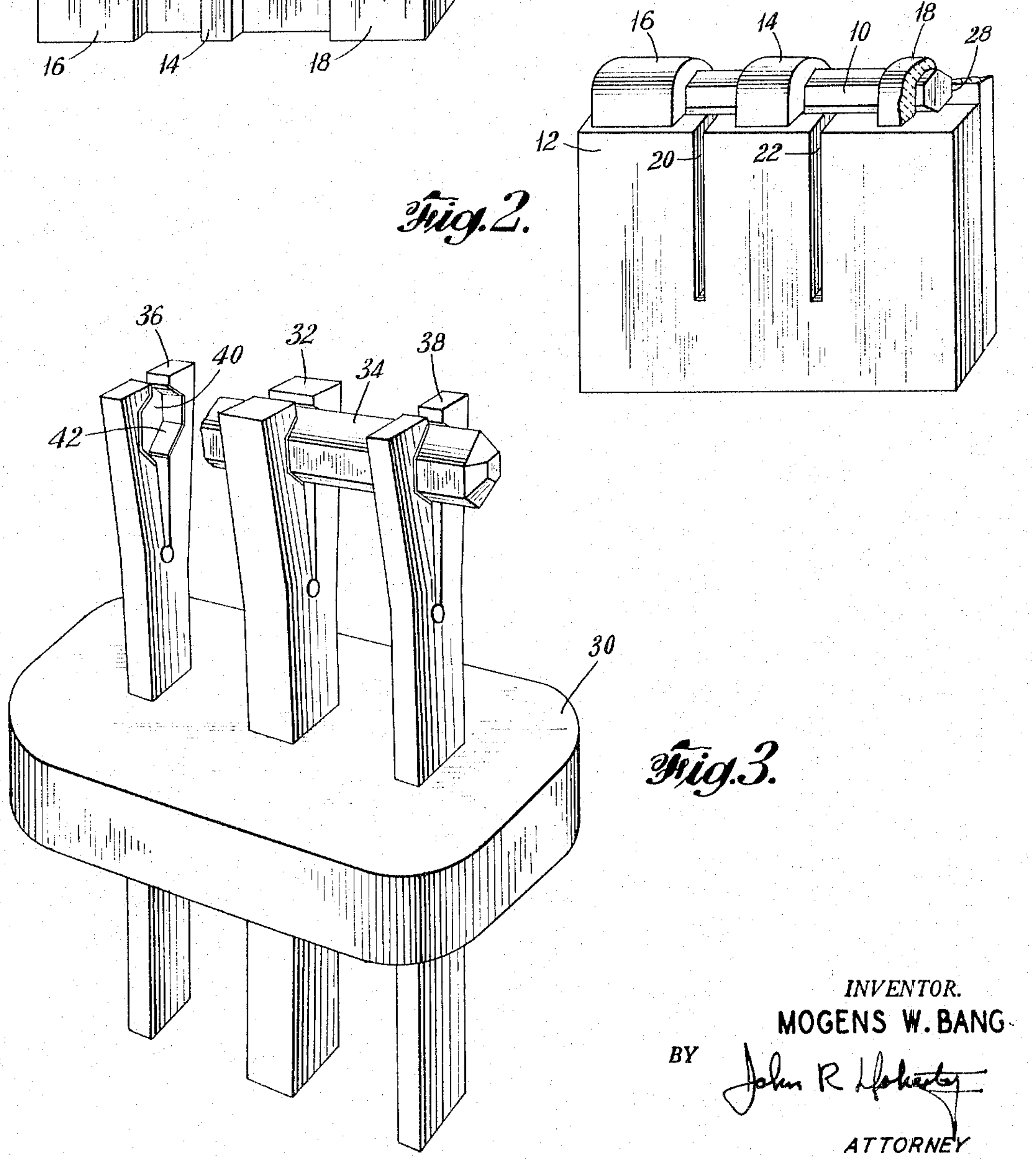
FIG. 2 is a similar view of another device, part being broken away to show details of its fabrication.
FIG. 3 is a similar view showing another device.

A modification of the whistor just described is shown in FIG. 2. In the modification the whisker 10 is mounted in juxtaposition to one edge of the insulating support plate 12. This whistor is fabricated by initially depositing or etching the metallic strips 14, 16 and 18 onto the insulating support plate 12 in the same manner as described above, after which a part of the plate 12 at one edge is removed. The whisker 10 is then mounted to the plate 12, and the metallic strips 14, 16 and 18 after being heated to a sufficiently high alloying tempertaure are rolled over the whisker 10 to make contact to it.

Referring to FIG. 3, another whistor construction is shown in which an insulating support plate 30 has mounted therein a metallic clip 32 for making a rectifying contact to a hexagonal whisker 34. In a like manner a pair of metallic clips 36 and 38 make ohmic contacts to the whisker 34 and are mounted in the insulating support plate 30. As indicated at 40, the metallic clips 32, 36 and 38 have hexagonal apertures within which the whisker 34 is supported. These apertures preferably are plated with a metallic coating containing an additive appropriately chosen for making the rectifying or ohmic contacts to the whisker 34 as indicated at 42. In the fabrication of this whistor, the metallic clips 32, 36 and 38 are initially mounted to the insulating support plate 30 at spaced intervals sufficient to provide the proper contact separation in the whistor. The whisker 34 is then placed into the clip apertures in each of the metallic clips 32, 36 and 38 which are then compressed under sufficient heat to establish a bond between the plated coatings in the apertures and the whisker 34.

Figure 4:
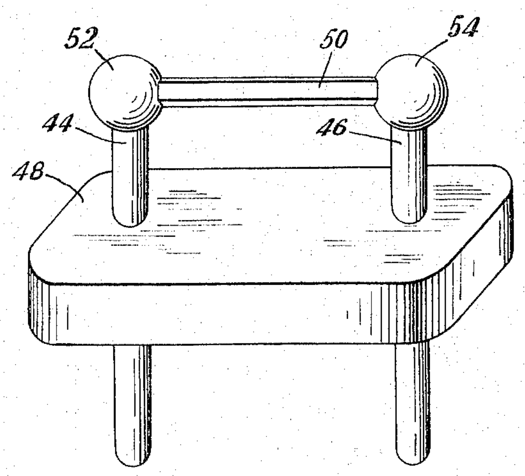
FIG. 4 is a perspective view of still another device.

A diode of a construction embodying the principles of the invention is shown in FIG. 4. In this diode a pair of metallic pins 44 and 46 are mounted in an insulating support plate 48 and provide a support for the whisker 50. The metallic pins 44 and 46 support metallic alloy pellets 52 and 54, one of which makes a rectifying contact and the other of which makes an ohmic contact to the whisker 50. This diode is fabricated by initially mounting the metallic pins 44 and 46 in the insulating support plate 48 in the desired spaced relation sufficient to attain the proper contact separation in the diode. The metallic alloy pellets 52 and 54 are positioned to the metallic pins 44 and 46 and are then heated. The whisker 50 is then dropped into the molten pellets 52, 54, the temperature of which is sufficiently high to effect alloy formation with the whisker 50. It will be appreciated of course that instead of the use of metallic alloy pellets, droplets of metallic alloy paste can be used equally as well in order to attain the contacts to the whisker 50.

The construction just described is also admirably suited to the fabrication of a resistor. As already indicated, a carbon or graphite whisker may suitably be utilized as the operative element. The resistor is fabricated in substantially the same manner as described for the diode. The metallic pellets 52 and 54 should be composed of a metal which will readily bond to the carbon or graphite whisker, a suitable metal being copper, for example.

FIG. 5 shows another whistor construction in which metallic clips 58, 60 and 62 are mounted in an insulating support plate 64 for making both rectifying and ohmic contacts to the whisker 66. This construction is characterized in that the metallic clips 58, 60 and 62 are curled around the whisker 66 to make rectifying and ohmic contacts as indicated at 68. In addition, the metallic clips 58, 60 and 62 in a like manner as shown in the whistor construction of FIG. 3 are plated with a coating of an alloying metal as indicated at 70. In the fabrication of this whistor, the metallic clips 58, 60 and 62, in order to provide a support for the whisker 66, are bent into a somewhat L shape prior to assembly, this being illustrated by the configuration shown for the metallic clip 60. The metallic clips 58, 60 and 62 are mounted in the insulating support plate 64 at spaced intervals sufficient to provide the contact separation desired in the whistor. The metallic clips 58, 60 and 62 are then curled around the whisker 66 while the metallic coatings thereon are heated to achieve a bond between them and the whisker 66. It will also be appreciated that instead of plating the metallic clips 58, 60 and 62 with an alloying metal, the contacts may be attained by coating the clips with a metallic alloy paste during the fabrication of the whistor. A modified metallic clip for this construction is shown in FIG. 5*a*. In this modification a pair of metallic clips 72 and 74 are joined together to provide a U-shaped support for the whisker 66 as indicated at 76. The metallic clips 72 and 74 may suitably be curled over the whisker 66 in the manner as above described.

A construction for a whistor in which similar double clips are utilized in still another way is shown in FIG. 6. In this instance an insulating support plate 78 has mounted therein a metallic double clip 80 providing a U-shaped support having slots as indicated at 82 within which the whisker 84 is mounted. To achieve a rectifying contact a metallic alloy paste 86 is provided within the U-shaped portion of the metallic clip 80 circumferentially about the whisker 84. Also mounted in spaced relation to the metallic clip 80 is a pair of similar metallic clips 88, 90 having similar slots as indicated at 92, 94 for supporting the whisker 84. In a like manner ohmic contacts are attained by a metallic alloy paste 96, 98. The metallic alloy paste during fabrication of this whistor is heated to a temperature sufficient to effect alloying with the whisker 84. It will be appreciated of course that metallic alloy pellets can be used instead of the metallic paste and that the metallic clips may be made in one piece instead of the double clip arrangement shown.

The constructions thus far described are characterized in that the contact elements are mounted in an insulating support plate. The insulating support plate serves to hold the contact elements in pre-determined positions so that they are adapted to make contact to the proper region of the whisker. A somewhat different construction is shown in FIG. 7. In this construction the whistor has a generally circular metallic support 100 having an aperture 102 within which is mounted a whisker 104. In the fabrication of this whistor construction a molten metallic alloy pellet 108 is first mounted in the aperture 102. The whisker 104 is then mounted through a V notch, indicated at 106, into the molten pellet 108 to provide a rectifying contact to the whisker 104 circumferentially about it. A pair of similar metallic supports 110 and 112 are provided and are spaced from the metallic support 100 by insulating rings 114 and 116. These insulating rings 114 and 116 are equivalent in width to the contact separation desired in the whistor and not only serve to properly space the metallic supports 110 and 112 but also serve to encapsulate the whisker 104. The metallic supports 110 and 112 each have apertures, as indicated at 118, within which the whisker 104 is supported, A pair of metallic alloy discs 120 and 122 make ohmic contacts to the whisker 104, these discs being suitably joined to each of the metallic supports 110 and 112. The insulating rings 114 and 116 may be composed of a ceramic and are suitably metal plated so that they may be joined as by welding to the metallic contact elements 100, 110 and 112, respectively. When the whistor is assembled the metallic discs 120 and 122 are heated to temperatures sufficient to attain alloying with the whisker 104. The assembled whistor as a rigid unit is shown in FIG. 7*a*.

The separation between the rectifying and ohmic contacts may be more closely controlled in the printed circuit whistor construction described above as shown in FIG. 8. The whistor there shown is provided with an insulating support plate 124 having deposited or etched thereon metallic printed strips 126, 128 and 130. The metallic strip 128 makes a rectifying contact to the whisker 132 by a metallic alloy pellet or paste 134. In a like manner metallic alloy pellets or paste 136 and 138 are provided in contact with the metallic strips 126 and 130, and make ohmic contacts to the whisker 132. In this construction the insulating support plate 124 is provided with apertures 140 and 142 as best shown in FIG. 8*a*. These apertures 140 and 142 are situated between the metallic strips 126, 128 and 130 and determine the contact separation between the rectifying and ohmic contacts to the whisker 132. It will also be noted that the location of the apertures 140 and 142 in the insulating support plate 124 also determines the contact width of the rectifying contact to the whisker 132. Also to be noted, this whistor construction is provided with an insulating support frame 144 and electrically conductive prongs 146, 148 and 150 which particularly adapted it for use in conjunction with an electrical plug-in type socket.

A modification of the printed circuit whistor construction just described is shown in FIG. 9. In this modification the insulating support plate 124 is provided with apertures 152, 154 and 156 having mounted therein metallic alloy pellets or paste 158, 160 and 162, respectively. The metallic alloy pellet or paste 160 makes a rectifying contact to the whisker 132 and ohmic contracts are provided by the metallic alloy pellets or paste 158 and 162 as best shown in FIG. 9*a*. The contact width of the rectifying contact in this modified construction can be controlled by varying the size of the aperture 154. The separation between the rectifying and ohmic contacts in the whistor can be controlled in a like manner by varying the spacing between the apertures 152, 154 and 156 in the insulating support plate 124.

FIG. 10 shows a construction for a coupled whistor in which a plurality of whistor systems built on a single whisker may be utilized to provide a unit capable of use, for instance, as an amplifier. The coupled whistor shown comprises a single whisker 164 and has an insulating support plate 166 on which is mounted a pair of whistor systems having metallic printed strips 168, 170 and 172 and metallic printed strips 174, 176 and 178 suitably deposited or etched onto the insulating support plate 166. In the first whistor system rectifying contact to the whisker 164 is attained by a metallic clip 180 mounted over the edge of the insulating support plate 166 in contact with the metallic strip 170 and in the second whistor system by a metallic clip 190 mounted in a like manner to the insulating support plate 166 in contact with the metallic strip 176. Similarly, ohmic contacts in the first whistor system are achieved by clips 192 and 194 mounted in contact with metallic strips 168 and 172 and in the second whistor system by clips 196 and 198 mounted to the support plate 166 in contact with the metallic strips 174 and 178. Also utilized together with the metallic clips for making both rectifying and ohmic contacts to the whisker 164 are metallic alloy pellets or paste as indicated at 200 in FIG. 10*a*.

The pair of whistor systems in this construction are separated by a portion of the whisker 164, indicated at 202, which serves as a coupling or plate resistance. As indicated at 204, the whisker 164 also serves as a coupling resistance between the pair of whistor systems and an ohmic contact provided to the whisker 164 by a metallic clip 206. The metallic clip 206 is mounted in a like manner to the support plate 166 in contact with a metallic strip 208. As indicated at 210 and 212, the support plate 166 is provided with a multiplicity of slots, the widths of which determine the desired contact separation between the rectifying and ohmic contacts in the coupled whistor. Also as similarly shown in FIGS. 8 and 9, the coupled whistor is adapted for use in conjunction with an electrical socket by provision of electrically conductive prongs as indicated at 214.

Thus it will be seen that the invention provides a number of electrical current modifying devices having a whisker as their operative element which can be fabricated with little difficulty during manufacture. In the instance of a solid state device, particularly the whistor, the invention makes it possible to accurately attain both rectifying and ohmic contacts to the whisker despite its relatively small size and also makes it possible to more readily control the contact width and separation in such devices during their manufacture. In addition, the invention includes a method for fabricating electrical current modifying devices of the character herein described which is particularly adapted to large scale manufacture.

The electrical characteristics of electrical current modifying devices embodying the invention will depend upon many factors including particularly the electrical properties of the whisker. In the instance of a whistor, the electrical characteristics will depend primarily upon the resistivity of the whisker and its diameter, the composition of the rectifying and ohmic contacts, the rectifying contact width and the contact separation between the rectifying and ohmic contacts to the whisker. It will thus be appreciated that a great variety of whistors can be designed with characteristics particularly suited to many different types of applications.

Generally speaking, the contact elements in an electrical current modifying device embodying the invention should be of a fairly rigid structure and also preferably are of a size which is substantially larger than the whisker diameter. An an illustration, in some instances the contact elements have been at least three times larger and in other instances as much as ten times larger than the whisker diameter.

In one whistor made in accordance with the invention and of a construction similar to FIG. 1, a monocrystalline n-type whisker of silicon was utilized. The whisker was about 55 microns in diameter and had a length of approximately 2 mm. The insulating support plate was composed of a cordierite ceramic and had plated thereon metallic contact strips of silver. The metallic strip for the rectifying contact was about 200 microns in width and the metallic strips for the ohmic contacts were substantially larger being about 0.7 mm. in width. The separation between the metallic strips was approximately 200 microns. A metallic alloy paste was utilized and was placed on each of the metallic strips and the whisker was then placed into the metallic alloy paste. The metallic alloy paste was then heated to a temperature of about 600° C. At this temperature alloy formation between the metallic paste and the whisker was attained. The metallic alloy paste for the rectifying contact had a composition of 90 percent gold, 2.5 percent gallium and 7.5 percent of an organic binder. The metallic alloy paste for the ohmic contacts was composed of 90% gold, 1% antimony and 9% of an organic binder. The viscosity of the metallic alloy paste was such that the whisker could easily be placed into the metallic alloy paste wetting the whisker about its entire circumference. The device was tested and was found to show field effect and to exhibit desirable electrical characteristics.

It will be understood that many modifications may be made in the electrical current modifying devices described herein without departing from the spirit and scope of the invention.

I claim:

1. A whistor device comprising a semiconductor whisker as its operative element, an insulating support plate, at least three elongated bifurcated metallic clips, each clip having a aperture in said bifurcated end and the other end mounted on said support plate, said whisker being mounted in said apertures, and said clips holding said whisker in spaced relation to said support plate, said clips providing at least three spaced contacts with said whisker and comprising a rectifying contact and an ohmic contact on each side of said rectifying contact.

2. A whistor device as defined by claim 1 in which said apertures in said metallic clips are plated with an alloying metal and in which said contacts to said whisker are made by said metal.

3. A whistor device comprising a semiconductor whisker as its operative element, an insulating support plate, at least three elongated and generally U shaped metallic clips, each clip having one end mounted on said support plate and the other end in contact with said whisker, said clips holding said whisker in spaced relation to said support plate, said clips providing at least three spaced contacts with said whisker and comprising a rectifying contact and an ohmic contact on each side of said rectifying contact, and said clips having legs provided with slots within which said whisker is mounted and in which said contacts to said whisker are made by a metallic alloy paste applied to said metallic clips around said whisker.

4. A whistor device comprising a semiconductor whisker as its operative element, a generally circular first metallic support having an aperture within which said whisker is mounted, a metallic alloy pellet in said aperture in rectifying contact with said whisker, second and third metallic supports of a like configuration on each side of said first metallic support having apertures receiving said whisker, insulating rings between said metallic first support and each one of said second and third metallic supports, and a metallic disc mounted to each one of said second and third metallic supports and in ohmic contact with said whisker.

References Cited by the Examiner

UNITED STATES PATENTS

| | | | |
|---|---|---|---|
| Re. 25,161 | 4/1962 | Weiss | 317—234 |
| 1,874,744 | 8/1932 | Hathorn | 338—332 X |
| 2,023,517 | 12/1935 | Oreager et al. | 338—332 X |
| 2,556,991 | 6/1951 | Teal | 317—239 X |
| 2,600,500 | 5/1952 | Haynes et al. | 317—235 |
| 2,705,768 | 4/1955 | Kleimack et al. | 317—235 |
| 2,804,581 | 8/1957 | Lichtgam | 317—235 |
| 2,869,053 | 1/1959 | Schaper | 317—235 |
| 2,937,962 | 5/1960 | Kitchen et al. | 317—235 |
| 2,942,228 | 6/1960 | Swick | 317—234 X |
| 2,971,138 | 2/1961 | Meisel et al. | 317—235 |
| 2,978,618 | 4/1961 | Myers | 317—235 |
| 2,993,998 | 6/1961 | Lehovec | 317—235 |
| 3,021,462 | 2/1962 | Jones | 317—240 |
| 3,072,832 | 1/1963 | Kilby | 317—235 |
| 3,076,253 | 2/1963 | Cornelison et al. | 317—235 |
| 3,139,600 | 6/1964 | Rasmanis et al. | 317—235 |
| 3,176,376 | 4/1965 | Kelley | 317—235 |

FOREIGN PATENTS

| | | |
|---|---|---|
| 23,881 | 9/1915 | Great Britain. |

JOHN W. HUCKERT, *Primary Examiner.*

E. PUGH, J. D. KALLAM, J. D. CRAIG, *Assistant Examiners.*